(12) United States Patent
Saitou et al.

(10) Patent No.: US 6,403,731 B1
(45) Date of Patent: Jun. 11, 2002

(54) PROCESS FOR PREPARING POLYMER SOLUTION

(75) Inventors: Yukio Saitou; Shigeoki Kawaguchi; Kouhei Sawa; Tadahiko Kondou; Kazuhide Hayama, all of Mie (JP)

(73) Assignee: Mitsubishi Chemical America, Inc., White Plains, NY (US)

( * ) Notice: Subject to any disclaimer, the term of this patent is extended or adjusted under 35 U.S.C. 154(b) by 0 days.

(21) Appl. No.: 09/544,113

(22) Filed: Apr. 6, 2000

(30) Foreign Application Priority Data

Apr. 7, 1999  (JP) ............................. 11-100048

(51) Int. Cl.$^7$ ............................. C08F 2/06; C08F 20/06
(52) U.S. Cl. .................. 526/71; 526/317.1; 526/307.3; 526/307.4; 526/307.7; 526/72
(58) Field of Search ..................... 526/71, 72, 307.3, 526/307.4, 307.7, 317.1

(56) References Cited

U.S. PATENT DOCUMENTS

| | | |
|---|---|---|
| 3,635,917 A | 1/1972 | Roth et al. |
| 4,153,501 A | 5/1979 | Fink et al. |
| 4,242,476 A | 12/1980 | Shah et al. |
| 4,588,809 A | 5/1986 | Meyer et al. |
| 5,258,448 A | 11/1993 | Mallo et al. |
| 5,898,055 A | 4/1999 | Moriya et al. |

FOREIGN PATENT DOCUMENTS

| | | | | |
|---|---|---|---|---|
| DE | 3339384 | * | 5/1985 | ........... C08F/20/44 |
| JP | 52-48623 | | 4/1977 | |
| JP | 53-46386 | | 4/1978 | |
| JP | 53-46390 | | 4/1978 | |
| JP | 54-60344 | | 5/1979 | |
| JP | 3-81310 | | 4/1991 | |
| JP | 3-296568 | | 12/1991 | |
| JP | 10-87737 | | 4/1998 | |
| JP | 10-87738 | | 4/1998 | |

* cited by examiner

Primary Examiner—David W. Wu
Assistant Examiner—Tanya Zalukaeva
(74) Attorney, Agent, or Firm—Sughrue Mion, PLLC

(57) ABSTRACT

Disclosed is a process for preparing a polymer solution having a reduced unreacted unsaturated monomer content, comprising radically polymerizing at least one unsaturated monomer in a solvent in the presence of a radical polymerization initiator, the at least one unsaturated monomer having a lower boiling point than that of the solvent, wherein the weight ratio of the total amount of the unsaturated monomers to the solvent is from 1/9 to 7/3, the polymerization is carried out until the conversion of the unsaturated monomer having the lowest conversion of all the other unsaturated monomers whose boiling point is lower than that of the solvent reaches at least 85%, and, after completion of the polymerization, the reaction mixture is rectified to remove the unreacted unsaturated monomer or monomers.

7 Claims, No Drawings

PROCESS FOR PREPARING POLYMER SOLUTION

FIELD OF THE INVENTION

This invention relates to a process for preparing a polymer solution. More particularly, it relates to radical polymerization of unsaturated monomers in a solvent to prepare a polymer solution having a reduced content of the unreacted unsaturated monomers.

BACKGROUND OF THE INVENTION

Several methods for obtaining a polymer solution having a reduced content of an unreacted unsaturated monomer have been proposed to date. Known processes include (1) feeding nitrogen, etc. to vaporize an unsaturated monomer, (2) simple distillation to distill off an unsaturated monomer together with a solvent, (3) addition of a small amount of a polymerization initiator at the final stage of polymerization to accelerate polymerization of the remaining unsaturated monomer, (4) blowing ozone, etc. into the system at the final stage of polymerization to remove an unreacted unsaturated monomer, (5) addition of a basic substance capable of reacting with an acrylic ester monomer (i.e., unsaturated monomer), such as hydrazine, and (6) irradiation with an ionizing radiation, such as γ-rays.

However, any of these known methods cannot be recognized as a method providing a polymer solution having its unsaturated monomer content reduced sufficiently and therefore easy to handle, highly safe, and almost odorless.

JP-A-10-87738 (the term "JP-A" as used herein means an "unexamined published Japanese patent application") discloses a continuous polymerization process for obtaining a resin with excellent optical characteristics, in which polymerization is carried out in a system comprising not more than 25% by weight of a solvent, and the reaction mixture is distilled while withdrawing the bottom of a distillation column to remove the impurities, etc. by-produced in the polymerization. However, the polymer solution prepared by this method contains a large amount of unreacted monomer and therefore it is difficult for use in the fields where weight is: put on safety, such as the medical field and the cosmetic field.

SUMMARY OF THE INVENTION

An object of the present invention is to provide a process for preparing a polymer solution which has a sufficiently reduced residual unsaturated monomer content and therefore is easy to handle, highly safe, and almost odorless.

As a result of intensive studies, the present inventors have found that a polymer solution meeting the above object can be obtained by limiting the weight ratio of an unsaturated monomer(s) and a solvent to be charged and defining the conversion of an unsaturated monomer that has the lowest conversion of the other unsaturated monomers whose boiling point is lower than that of the solvent. The present invention has been completed based on this finding.

The gist of the invention resides in a process for preparing a polymer solution comprising radically polymerizing a monomer mixture comprising at least one unsaturated monomer in a solvent for the unsaturated monomer(s) and the polymer in the presence of a radical polymerization initiator, whereby at least one unsaturated monomer has a lower boiling point than that of the solvent, and wherein the weight ratio of the total amount of the unsaturated monomers to the solvent is in a range of from 1/9 to 7/3, the polymerization is carried out until the conversion of the unsaturated monomer having the lowest conversion of all the other unsaturated monomers whose boiling point is lower than that of the solvent reaches at least 85%, and, after completion of the polymerization, the unreacted unsaturated monomer(s) is removed under rectification conditions.

DETAILED DESCRIPTION OF THE INVENTION

The unsaturated monomers which can be used in the invention are not particularly limited. A monomer mixture comprising at least one unsaturated monomer whose boiling point is lower than that of the solvent used can be used. Therefore, the monomer mixture can contain an unsaturated monomer which has a higher boiling point than the solvent as long as the monomer is so polymerizable as to remain unreacted in only a trace amount. Further, the monomer mixture can contain an unsaturated monomer having a molecular weight of not less than 1000, such as a silicone macro-monomer, because such a macro-monomer has no problem of smell nor of safety even if it remains unreacted.

Examples of useful unsaturated monomers include unsaturated carboxylic acids, unsaturated carboxylic acid alkyl esters, N-alkyl-substituted amides of unsaturated carboxylic acids, alkyl vinyl esters, styrene derivatives, and alkyl vinyl ethers.

The unsaturated carboxylic acids include acrylic acid, methacrylic acid, and vinylacetic acid.

The term "alkyl" as used herein means a straight-chain or branched saturated hydrocarbon group which may be substituted with a functional group containing a nitrogen atom, an oxygen atom, etc. The alkyl group preferably contains 1 to 12 carbon atoms, particularly 1 to 8 carbon atom. Specific examples of the alkyl group are methyl, ethyl, propyl, n-butyl, isobutyl, t-butyl, 2-ethylhexyl, hydroxyethyl, and dimethylaminoethyl. The alkyl esters of the unsaturated carboxylic acids include methyl acrylate, methyl methacrylate, ethyl acrylate, ethyl methacrylate, t-butyl acrylate, t-butyl methacrylate, 2-ethylhexyl acrylate, 2-ethylhexyl methacrylate, hydroxyethyl acrylate, hydroxyethyl methacrylate, dimethylaminoethyl acrylate, and dimethylaminoethyl methacrylate.

The N-alkyl-substituted amides of the unsaturated carboxylic acids include N-methylacrylamide, N-t-butylacrylamide, and N,N-dimethylacrylamide. The alkyl vinyl esters include vinyl acetate, vinyl propionate, and vinyl butyrate. The styrene derivatives include styrene and α-methylstyrene. The alkyl vinyl ethers include methyl vinyl ether, ethyl vinyl ether, propyl vinyl ether, and butyl vinyl ether.

Of these unsaturated monomers preferred are unsaturated carboxylic acids, such as acrylic acid and methacrylic acid; alkyl esters thereof, such as t-butyl acrylate, t-butyl methacrylate, 2-ethylhexyl acrylate, and 2-ethylhexyl methacrylate; N-alkyl-substituted amides thereof, such as N-methylacrylamide, N-t-butylacrylamide, and N,N-dimethylacrylamide; and styrene.

The solvent which can be used in the present invention is not particularly limited. Solvents generally employed in solution polymerization can be used. Those capable of dissolving all the unsaturated monomers to be polymerized and the produced polymer are preferred. Examples of suitable solvents include alcohols, such as ethanol, isopropanol, t-butanol, 3-methoxy-3-methyl-1-butanol, 3-methyl-1,3-butanediol, and 2-methyl-1,3-propanediol; aliphatic hydrocarbons, such as heptane, isoparaffin, and n-paraffin;

aromatic hydrocarbons, such as toluene and xylene; esters, such as ethyl acetate, n-propyl acetate, isopropyl acetate, butyl acetate, and 3-methoxy-3-methylbutyl acetate; ketones, such as methyl ethyl ketone and methyl isobutyl ketone; and cyclic silicone solvents, such as octamethylcyclotetrasiloxane and decamethylcyclopentasiloxane. These solvents can be used either individually or as a mixture of two or more thereof.

Preferred among these solvents are multi-component aliphatic: hydrocarbons such as isoparaffin and n-paraffin. Multi-component aliphatic hydrocarbons having 8 to 18 carbon atoms, such as isoparaffin, are particularly preferred.

As the radical polymerization initiator which can be used in the present invention, any radical polymerization initiator known in the art can be used in the present invention. Suitable initiators include peroxides such as benzoyl peroxide and lauroyl peroxide, and azo compounds such as 2,2'-azobisisobutyronitrile, 2,2'-azobis-2,4-dimethylvaleronitrile, and dimethyl 2,2'-azobisisobutyrate.

The polymerization reaction is usually carried out by heating the reaction system comprising the solvent, the unsaturated monomer or monomers, and the radical polymerization initiator to a necessary temperature. The manner of charging the unsaturated monomers or the initiator is not particularly restricted. For example, the requisite amount may be present from the very beginning of the reaction, or may be added during the reaction either continuously or in portions.

What is essentially required is that the weight ratio of the total amount of the unsaturated monomers to the solvent to be charged is in a range of from 1/9 to 7/3. That weight ratio is preferably 1.5/8.5: to 7/3, more preferably 2/8 to 6/4. If the weight ratio of the unsaturated monomers is lower than 1/9, the polymerization rate is too low, which is not only inefficient but disadvantageous for reduction in residual unsaturated monomer content. If the weight ratio of the unsaturated monomers exceeds 7/3, it is difficult to remove the heat of reaction, and the resulting polymer solution is too viscous for the practical use.

The polymerization temperature is selected appropriately so that the radical polymerization initiator may act satisfactorily. It usually ranges 40 to 120° C., preferably 50 to 100° C., more preferably 60 to 90° C. The reaction time, while dependent on the initiator, the monomers, the reaction temperature, etc., is generally 4 to 24 hours, preferably 6 to 22 hours, more preferably 8 to 20 hours.

In carrying out the present invention it is necessary to select the reaction conditions from among the above-mentioned ranges so that the unsaturated monomer which has a lower conversion than any other unsaturated monomer whose boiling point is lower than that of the solvent may achieve a conversion of at least 85%, preferably 90% or higher. If the conversion of the unsaturated monomer which has the lowest conversion among the unsaturated monomers whose boiling point are lower than that of the solvent is less than 85%, not only is the polymer yield poor, but the efficiency in removing the unreacted unsaturated monomers is poor.

If desired, the polymerization may be carried out in the presence of a commonly employed molecular weight regulator, such as mercapto compounds.

After completion of the reaction, the unreacted unsaturated monomers are removed from the resulting polymer solution by distillation to efficiently provide a polymer solution which is easy to handle, highly safe, and almost odorless.

Distillation for unreacted monomer removal after the polymerization is not particularly restricted as far as rectification conditions are selected. Rectification is usually carried out at a number of theoretical plates of 3 or more, preferably 4 or more, more preferably 5 or more, and a reflux ratio of 0.5 or higher, preferably 0.7 or higher, more preferably 1.0 or higher, thereby to distil off the unreacted unsaturated monomers and the solvent. Where the number of theoretical plates is smaller than 3, or where the reflux ratio is smaller than 0.5, a large quantity of the solvent should be distilled off so as to remove the unreacted unsaturated monomers, which is not efficient.

The amount of the solvent distilled off is preferably not more than 20% by weight, particularly 15% by weight or less, based on the amount of the solvent charged into the polymerization reactor.

In order to carry out the present invention effectively, it is preferred that the concentration of the unreacted unsaturated monomers in the distillate be 70% by weight or lower, particularly 60% by weight or lower. Where the concentration exceeds 70%, polymerization of the unsaturated monomers in the distillate is likely to occur in the distillation column, the refluxing tank, etc., which can cause such problems as clogging.

In the present invention, addition of a polymerization inhibitor to the distillation column, etc. is not particularly required. It is rather preferred not to use any polymerization inhibitor for safety considerations particularly in cases where the polymer obtained is used as a base for cosmetics, and the like.

The steps of polymerization and distillation can be conducted either in separate apparatus or in an apparatus. In the former case, the polymer solution from the polymerization reactor is transferred to a distillation apparatus, where the unreacted unsaturated monomers are distilled off. In the latter case, a reactor equipped with a distillation column is used, in which the polymerization reaction is followed by distillation.

There is thus obtained a polymer solution having an extremely low total concentration of the unreacted unsaturated monomers, e.g., 1000 ppm or less, preferably 500 ppm or less, still preferably 300 ppm or less. The resulting polymer solution is of high safety and almost odorless and therefore suitable for uses where weight is put on safety, such as the medical field and the cosmetic field. The polymer solution can be used either as such or as diluted with other solvents. Where an isoparaffinic solvent has been used in the polymerization, the polymer solution can be used in the form of an oil-in-water emulsion.

The present invention will now be illustrated in more detail by using Examples and Comparative Examples, but it should be understood that the invention is not construed as being limited thereto. Unless otherwise noted, all the percents, parts, and parts per million (ppm) are given by weight.

EXAMPLE 1

In a five-necked flask equipped with a reflux condenser, a dropping funnel, a thermometer, a tube for introducing nitrogen, and a stirrer were charged 150 parts of isododecane (boiling point: 180° C.) and 1 part of 2,2'-azobis-2,4-dimethylvaleronitrile and heated up to 70° C. in a nitrogen stream. After the temperature reached 70° C., a mixture of 80 parts of t-butyl acrylate (boiling point: 121° C.) and 20 parts of 2-ethylhexyl methacrylate (boiling point: 229° C.) was added thereto dropwise over 2 hours. After the addition, the reaction was further continued at 70° C. for an additional 1 hour period, and the temperature was raised up to 85° C., at which the reaction was continued for 5 hours. The resulting reaction mixture was an about 40% solution of a polymer having a weight-average molecular weight of 125,000 containing 4500 ppm of t-butyl acrylate and 180 ppm of 2-ethylhexyl methacrylate based on the polymer.

A distillation apparatus having a theoretical plate number of 7 (the refluxing tank had a capacity corresponding to 3% of the charged solvent) was fitted to the reactor, and the polymer solution was distilled at 80° C. and at a reflux ratio of 5 under reduced pressure to remove 8% of the charged solvent. As a result, the residual unsaturated monomers, t-butyl acrylate and 2-ethylhexyl methacrylate, were reduced to 150 ppm and 120 ppm, respectively, based on the polymer. The total unreacted unsaturated monomer content being reduced to 270 ppm, the resulting polymer solution was free of the odor of unsaturated monomers and very safe.

EXAMPLE 2

In the same five-necked flask as used in Example 1 were charged 122 parts of commercially available isoparaffin having 10 to 12 carbon atoms (Isoper G, available from Exxon Corp.; boiling point: 158–175° C.) and 1 part of dimethyl 2,2'-azobisisobutyrate and heated to 80° C. in a nitrogen stream. After the temperature reached 80° C., a mixture of 90 parts of t-butyl acrylate and 10 parts of 2-ethylhexyl methacrylate was added thereto dropwise over 4 hours. After the addition, the reaction was continued at that temperature for 4 hours. The resulting reaction mixture was an about 45% solution of a polymer having a weight-average molecular weight of 95,000 containing 8200 ppm of t-butyl acrylate and 40 ppm of 2-ethylhexyl methacrylate based on the polymer.

A distillation apparatus having a theoretical plate number of 7 (the refluxing tank had a capacity corresponding to 3% of the charged solvent) was fitted to the reactor, and the polymer solution was distilled at 80° C. under total reflux under reduced pressure. At the time when the composition in the refluxing tank became steady, the polymer solution was distilled in three divided batches each to remove 2.5% of the charged solvent (total: 7.5%). As a result, the residual unsaturated monomers, t-butyl acrylate and 2-ethylhexyl methacrylate, were reduced to 90 ppm and 30 ppm, respectively, based on the polymer. The total unreacted unsaturated monomer content being reduced to 120 ppm, the resulting polymer solution was free of the odor of unsaturated monomers and had high safety.

EXAMPLE 3

In the same five-necked flask as used in Example 1 were charged 400 parts of commercially available isoparaffin having 12 to 15 carbon atoms (Isoper M, available from Exxon Corp.; boiling point: 218–253° C.), 5 parts of acrylic acid (boiling point: 141° C.), 75 parts of t-butyl acrylate, 20 parts of a silicone macromer having a molecular weight of 5,000 (FMO 721, available from Chisso Corp.), and 1 part of 2,2'-azobisisobutyronitrile and allowed to react at 80° C. over a period of 8 hours in a nitrogen stream. The resulting reaction mixture was an about 25% solution of a polymer having a weight-average molecular weight of 140,000 containing 1200 ppm of acrylic acid and 12,000 ppm of t-butyl acrylate based on the polymer.

A distillation apparatus having a theoretical plate number of 10 (the refluxing tank had a capacity corresponding to 2% of the charged solvent) was fitted to the reactor, and the polymer solution was distilled at 80° C. under total reflux under reduced pressure. At the time when the composition in the refluxing tank became steady, the polymer solution was distilled in three divided batches each to remove 1.5% of the charged solvent (total: 4.5%). As a result, the residual unsaturated monomers, acrylic acid and t-butyl acrylate, were reduced to 20 ppm and 60 ppm, respectively, based on the polymer. The total unreacted unsaturated monomer content being reduced to 80 ppm, the resulting polymer solution was free of the odor of unsaturated monomers and had high safety.

COMPARATIVE EXAMPLE 1

Polymerization reaction was carried out in the same manner as in Example 2. The resulting polymer solution was subjected to simple distillation to remove 20% of the charged solvent. The resulting polymer solution emitted the odor of unsaturated monomers, containing 3800 ppm of t-butyl acrylate and 160 ppm of 2-ethylhexyl methacrylate based on the polymer.

COMPARATIVE EXAMPLE 2

Polymerization reaction was carried out in the same manner as in Example 2. An additional one part of dimethyl 2,2'-azobisisobutyrate was added to the reaction system, and the reaction was further continued at 80° C. for 16 hours. The resulting polymer solution gave off the odor of unsaturated monomers, containing 1800 ppm of t-butyl acrylate and 20 ppm of 2-ethylhexyl methacrylate based on the polymer.

The process of the present invention provides a polymer solution which has a reduced content of unreacted unsaturated monomers and is therefore highly safe and almost odorless.

While the invention has been described in detail and with reference to specific examples thereof, it will be apparent to one skilled in the art that various changes and modifications can be made therein without departing from the spirit and scope thereof.

This application is based on Japanese patent application Hei-11-100048, filed Apr. 7, 1999, incorporated herein by reference.

What is claimed is:

1. A process for preparing a polymer solution comprising radically polymerizing a monomer mixture comprising at least one unsaturated monomer in a solvent for the unsaturated monomer(s) and the polymer in the presence of a radical polymerization initiator, said at least one unsaturated monomer having a lower boiling point than that of the solvent, wherein (a) the weight ratio of the total amount of the unsaturated monomers to the solvent is in a range of from 1/9 to 7/3, (b) the polymerization is carried out until the conversion of the unsaturated monomer having the lowest conversion of all the other unsaturated monomers whose boiling point is lower than that of the solvent reaches at least 85%, (c) after completion of the polymerization, the reaction mixture is distilled under rectification conditions to remove the unreacted unsaturated monomer or monomers, (d) the rectification conditions are a number of theoretical plates of 3 or more and a reflux ratio of 0.5 or higher, and (e) the amount of the solvent removed after the distillation is 20% by weight or less based on the amount of the charged solvent.

2. The process according to claim 1, wherein the concentration of the unreacted unsaturated monomers in the distillate is 70% by weight or lower.

3. The process according to claim 1, wherein said solvent is a multi-component mixed solvent.

4. The process according to claim 1, wherein said solvent is an aliphatic hydrocarbon.

5. The process according to claim 1, wherein said solvent is isoparaffin.

6. The process according to claim 1, wherein said at least one unsaturated monomer is selected from the group consisting of an unsaturated carboxylic acid, an unsaturated carboxylic acid alkyl ester, an N-alkyl-substituted amide of an unsaturated carboxylic acid, an alkyl vinyl ester, a styrene derivative, and an alkyl vinyl ether.

7. The process according to claim 1, wherein said at least one unsaturated monomer is selected from the group consisting of acrylic acid, methacrylic acid, t-butyl acrylate, t-butyl methacrylate, 2-ethylhexyl acrylate, 2-ethylhexyl methacrylate, N-methylacrylamide, N-t-butylmethacrylamide, styrene, and N,N-dimethylacrylamide.

* * * * *